(12) United States Patent
Lui et al.

(10) Patent No.: US 10,571,336 B2
(45) Date of Patent: Feb. 25, 2020

(54) SYSTEM AND METHOD FOR COLOR MATCHING

(71) Applicant: My Nudest, Inc., Brooklyn, NY (US)

(72) Inventors: Atima Lui, Brooklyn, NY (US); Nyalia Lui, Indianapolis, IN (US); Mahmoud Afifi, Toronto (CA); Ariadne Bazigos, Brooklyn, NY (US)

( * ) Notice: Subject to any disclaimer, the term of this patent is extended or adjusted under 35 U.S.C. 154(b) by 69 days.

(21) Appl. No.: 16/102,662

(22) Filed: Aug. 13, 2018

(65) Prior Publication Data

US 2019/0049303 A1    Feb. 14, 2019

Related U.S. Application Data

(60) Provisional application No. 62/544,803, filed on Aug. 12, 2017.

(51) Int. Cl.
*G01J 3/46*   (2006.01)
*H04N 1/60*   (2006.01)
*H04N 1/62*   (2006.01)

(52) U.S. Cl.
CPC ............ *G01J 3/463* (2013.01); *H04N 1/6005* (2013.01); *H04N 1/6008* (2013.01); *H04N 1/608* (2013.01); *H04N 1/6077* (2013.01); *H04N 1/6086* (2013.01); *G01J 2003/466* (2013.01); *H04N 1/628* (2013.01)

(58) Field of Classification Search
CPC .. G01J 3/463; G01J 2003/466; H04N 1/6005; H04N 1/6008; H04N 1/6077; H04N 1/608; H04N 1/6086; H04N 1/628
See application file for complete search history.

(56) References Cited

U.S. PATENT DOCUMENTS

2015/0220806 A1* 8/2015 Heller ................... G06F 16/583
382/159

* cited by examiner

*Primary Examiner* — Jamil Ahmed
(74) *Attorney, Agent, or Firm* — Kristin A. Grant; Grant Attorneys at Law PLLC

(57) ABSTRACT

A system for analyzing and processing user input and providing a result based on a predetermined set of color identifiers, the system comprising a first user input, wherein the first user input comprises of one or more digital images, a second user input, wherein the second user input comprises of responses to queries, a white balancing method for removing color casts from the first user input to create a final corrected image of the first user input, a first database for storing a predetermined set of color identifiers, a second database for storing product profiles, and a processor for analyzing the final corrected image of the first user input and the second user input collectively, comparing the final corrected image of the first user input and the second user input collectively to the predetermined set of color identifiers, and providing a color output.

12 Claims, 14 Drawing Sheets
(3 of 14 Drawing Sheet(s) Filed in Color)

FIG. 8

NUDEST

ABOUT  HOW IT WORKS

🔒 mynudest.com

🛒Shopping Cart  0

FIND YOUR MATCH

USD ▾
or Sign in

NUDEMETER
○○○○○

During which season do you
tan the most

○ December, January, February
○ March, April, May
○ June, July, August
○ September, October, November
○ I tan all year round
○ I choose not to tan Back    Next We're online.

FIG. 9

SYSTEM AND METHOD FOR COLOR MATCHING

CROSS REFERENCE TO RELATED APPLICATIONS

This application claims the benefit of U.S. Provisional Application No. 62/544,803, filed Aug. 12, 2017 of which the disclosure is incorporated herein by reference.

BACKGROUND

Field of the Invention

The present invention relates generally to a system and method for color matching, and more specifically to a system and method for matching a color input by a user to a selection of predetermined color identifiers.

Related Art

The word nude used in relation to clothing or makeup is defined as resembling the wearer's skin. For decades, nude undergarments have been considered a staple in a woman's wardrobe. One of the main reasons being that flesh-tone undergarments do not typically show through a wearer's clothes. Nude undergarments have traditionally been limited to shades of tan and beige, which in reality are not "flesh-tone" for all skin tones. With the advent of the "nude for all trend" and efforts to expand the meaning of the word nude, several companies are introducing nude undergarments to accommodate the infinite range of skin tones that exist.

The need to determine the perfect shade of nude for a wearer's skin is also seen in the makeup industry where a wearer seeks their ideal color foundation or the perfect shade of nude lipstick.

The present invention discloses a color matching system for assisting a wearer in finding the perfect shade of nude to match their skin tone as well as other colors which are complementary to their skin tone. The invention includes a white balancing method applied to images in the sRGB color space for correcting illumination casts. While there are other color matching systems known in the art, these systems either do not apply any color correction techniques thereby failing to obtain an ideal color match or use color correction techniques that were designed to work with RAW images only and not with images in the sRGB color space. What is needed is a system and method for accurately identifying a user's skin tone by accounting for the illumination conditions of an image and accounting for the changes in a user's skin tone with the changing seasons. The present system and method uses an affine transformation correction matrix in the Y'CbCr color space to provide a more accurate color correction. The invention exploits the properties of human skin tone to estimate the correction matrix by using a local regression derived from a large number of training points. By correcting the colors of an input image, skin tone predictions are improved and are consistent in different lighting conditions. While the present invention is mainly discussed in relation to skin tone matching, the system and method may be applied to any image in the sRGB color space. This may include but is not limited to, images of products or color swatches.

SUMMARY OF THE INVENTION

It is to be understood that the phraseology and terminology employed herein are for the purpose of the description and should not be regarded as limiting.

The present invention is directed to a system and method for color matching, and more specifically to a system and method for analyzing user input and providing a result based on a predetermined set of color identifiers, the system and method comprising of a first user input, a second user input, a white balancing method for removing color casts from the first user input, a database for storing a predetermined set of color identifiers, and a processor for analyzing the first user input and the second user input each individually and/or collectively, comparing the first user input and the second user input each individually and/or collectively to the predetermined set of color identifiers, and providing a color output. The processor further displaying product suggestions based on the produced color output. Where the invention is used in relation to matching a user's skin tone, the color output may consist of a range of color identifiers which are provided as a result of the processor accounting for changes in skin tone during various seasons. These and other features of the present invention will become readily apparent upon further review of the specification and drawings.

BRIEF DESCRIPTION OF THE DRAWINGS

The patent or application file contains at least one drawing executed in color. Copies of this patent or patent application publication with color drawings) will be provided by the Office upon request and payment of the necessary fee.

Embodiments of the present invention will be described by way of example only, and not limitation, with reference to the accompanying drawings in which:

FIG. 8 shows a screen prompting a second user input;
FIG. 9 shows a screen prompting a second user input.

DETAILED DESCRIPTION

Figure 1:
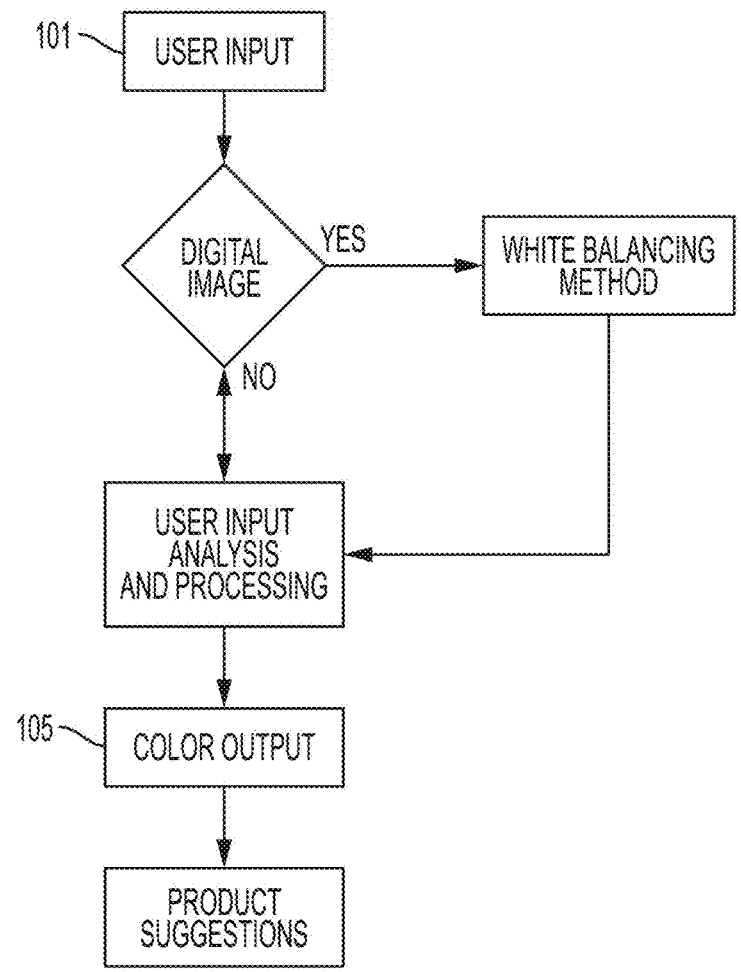
FIG. 1 is a flow diagram showing the steps of a user of an embodiment of the present invention.
Figure 2:
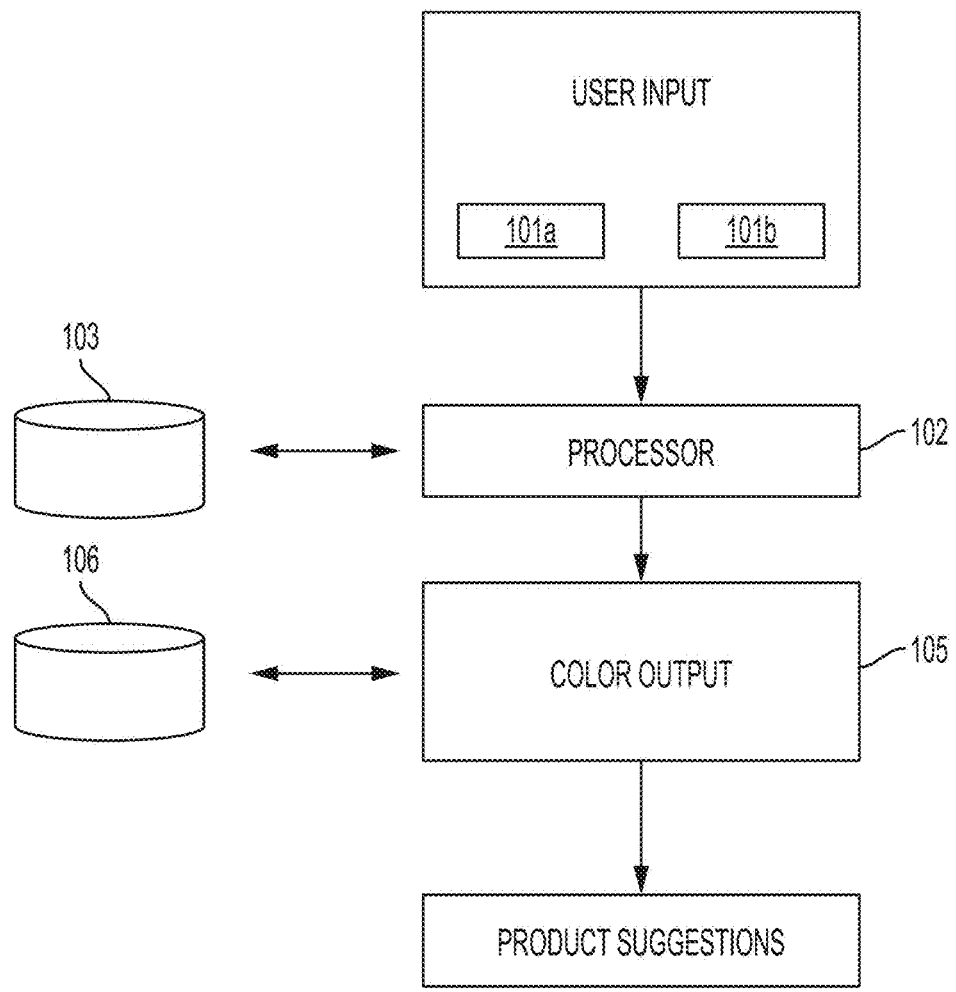
FIG. 2 shows a block diagram of the system and method according to an embodiment of the present invention.

The present invention discloses a system and method of color matching, the system and method comprising broadly of color correction of an image and identification of specific colors in said color corrected image. Referring now to the figures, where similar reference characters denote similar elements throughout the figures, in FIGS. 1 and 2 a user electronically submits a user input 101, where the user input 101 is in the form of a digital image of a user's face. Said user input 101 is modified to account for illumination conditions by means of a white balancing method. The user input 101 is compared to a predetermined set of color identifiers 108, which are stored in a first database 103, to produce a color output 105. The color output 105 is compared to available products stored in a second database 106 to display suggested products to the user based on the produced color output 105.

Figure 4:
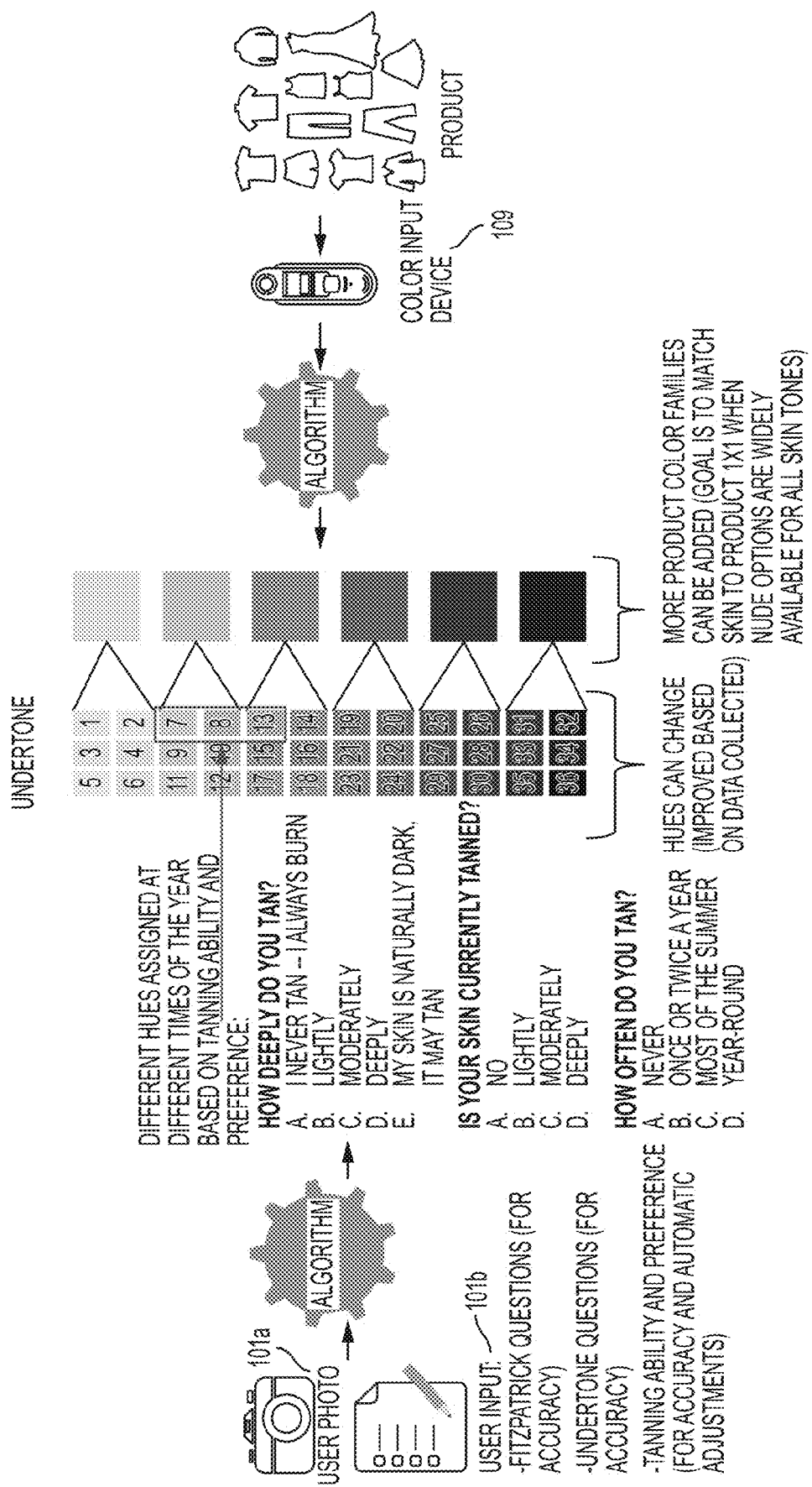
FIG. 4 shows a front end and back end of a system and method according to an embodiment of the present invention.

In FIG. 4, products are scanned using a color measuring device 109 and a color identifier is assigned to each product's profile, which is stored in the second database 106. The color output 105 assigned to the user is compared to the color identifiers of the products stored in the second database 106 and products with color identifiers corresponding to the color output 105 assigned to the user are displayed for the user to view and purchase.

In an embodiment of the present invention, the user input 101 may comprise of a first user input 101a and a second user input 101b, the first user input 101a comprising of one or more digital images and the second user input 101b comprising of user responses to queries. The one or more digital images of the first user input 101a are modified to account for the effects of illumination via a white balancing method. The white balancing method includes the stages of illuminant estimation and color correction.

By way of example only, we will discuss the white balancing method in relation to an image of a user's face, however, as with the invention as a whole, the white balancing method may be applied to any image in the sRGB color space. A close-up image of a user's face results in skin pixels occupying a considerable amount of the image where these pixels can be used as a cue to drive the color correction matrix. Skin tone results from a two-layer structure; The top layer is the epidermis which contains melanin and the inner layer is the dermis which contains hemoglobin. Different skin tones are the result of the varying densities of the pigments in these two layers. Based on these properties of skin colors, the skin colors can be clustered in the color space and used as guidance to estimate the color correction matrix.

The white balancing method is directed to sRGB images where a majority of the image contains a user's skin tone. A processor 102 converts the sRGB face image into the Y'CbCr color space where Y' represents the luma component and Cb and Cr represent the blue-difference and red-difference chroma components respectively. An affine color correction matrix is created by extracting a color feature vector from the CbCr channel of the image, locating similar color feature vectors from a set of training samples and applying a local regression based on the training samples with similar color feature vectors. The affine color correction matrix is applied to the CbCr channel of the image to remove color casts from the image to produce a color corrected image. Contrast stretching is applied to the Y' channel of the corrected image, and the Y' channel of the original image and the result of the contrast stretching of the corrected image are blended to produce a final corrected image.

More specifically, the colors of the user input $I_{input}$ can be corrected by applying a 3×3 affine transformation matrix T to the Cb and Cr channels of the image, assuming that the luma of the user input $I_{input}$ and the corrected image are the same. During the training stage, T can be calculated by minimizing the following equation ("Equation 1"):

$$\operatorname*{argmin}_{T} |([I_{input(Cb)}, I_{input(Cr)}, q])T - [I_{t(Cb)}, I_{t(Cr)}, q]|^2$$

where q is an N×1 homogeneous coordinate vector and $I_1$ is a ground truth corrected image. T must contain a [0, 0, 1] at the last row, meaning 6 parameters should be estimated to represent the scale, rotation, and translation of the Cb and Cr components of the input image to correct its colors.

Let D, represent the distribution of the Cb and Cr components of a face image, D can be represented by the following equation ("Equation 2"):

$$D \sim N(\mu, \Sigma)$$

where, $\mu \in IR^2$ represents the mean of D and $\Sigma$ is the 2×2 covariance matrix of the Cb and Cr components of D. A compact representation of D can be extracted by using only the distribution parameters, namely $\mu$ and $\Sigma$. Thus, a color feature vector v of any given image is created, such that $v=[\mu, vec(\Sigma)]$, where vec(.) denote the vectorization of a matrix.

Assuming there are L training points, each one is represented by a color feature vector $v_{t(i)} \in IR^6$. $T_{(i)}$ denotes the associated parameters of the one-to-one affine transformation matrix, obtained by Equation 1, that could effectively correct the color casts of the training image represented by $v_{t(i)}$. The similar n color feature vectors to $v_{input}$ is represented by $V_t$, where $V_t$ is an n×6 matrix—the L2 distance is adopted as a similarity metric. The parameters of the color correction matrix for $I_{input}$ can be estimated by the following equation ("Equation 3"):

$$\hat{T} = V_t W$$

where W is a 6×6 weighting matrix that can be computed in closed form:

$$W = (V_t^T V_t)^{-1} V_t^T T_t$$

where $T_t$ is the n×6 vectorized parameters of the color correction matrices associated to the n color feature vectors in the training data.

The initial corrected image $I_{wb*}$ and the final white balanced image are generated by the following equations ("Equation 4" and "Equation 5", respectively):

$$[I_{wb*(Cb,Cr)}, q] = [I_{input(Cb)}, I_{input(Cr)}, q] T^*$$

$$I_{wb(i)} = (1-\beta) I_{wb*(i)} + \beta((I_{wb*(i)} - \min(I_{wb*(i)}, \tau_1))/(\max(I_{wb*(i)}, \tau_2) - \min(I_{wb*(i)}, \tau_1)))$$

where T* is the reconstructed affine transformation matrix from $\hat{T}$, min(.), max(.) compute the min and max values after excluding the lower and higher values based on the trimming thresholds $\tau_1$ and $\tau_2$, respectively, i={Y', Cb, Cr}, and $\beta$ is a hyperparameter for blending the image after applying the contrast stretching to the initial corrected image $I_{wb*}$ whose luma component is the same as $I_{input}$.

In order to predict the skin color of the given face image, the white balanced image $I_{wb}$ is first produced by the white balancing method and the face region of the image is then extracted using face detection technology. In an image, there are a number of factors that may affect the brightness of the skin pixels such as shadows, specularities, or occlusions. Therefore, a preferred embodiment of the present invention relies on a confident set of skin pixels having skin probabilities greater than the 0.85 quantile of the distribution of the skin probabilities of the face region. The skin probabilities for each pixel is determined by a method disclosed by Dr. Ciarán Ó Conaire. Conaire's method discloses a non-parametric histogram-based model trained using manually annotated skin and non-skin pixels. An RGB histogram is created for "skin pixels" and another one for "non-skin pixels". For a particular pixel color, the log likelihood of it being skin is log(H(R,G,B)/J(R,G,B)), where H is the skin histogram, and J is the non-skin histogram, where {R, G, B} represent the red, green, and blue channel of the sRGB images. For a new image, the log likelihood of each pixel is calculated and then the result is compared to the threshold values to decide whether it is skin or non-skin. While we are using face detection technology as an example, other technologies may be appropriately used where the image comprises of another body part such as the user's hand, foot, etc.

The selected skin pixels may have different levels of brightness due to the shadows in the image. Dark pixels could be discarded in order to get rid of shadows; however, this may also remove pixels for a dark skin tone. To compromise, the skin pixels are first clustered into k clusters using K-means algorithm and sorted based on the brightness level of each cluster. Given k clusters representing the skin pixels and w which denote the weighted vectors of each cluster (i.e., the normalized number of pixels associated with each cluster), the darkest |k/2| clusters are discarded. Then, the initial skin tone $s' \in IR^3$ is given by the following equation ("Equation 6"):

$$s' = \sum_{j}^{k-\lfloor k/2 \rfloor} w'_j C_j$$

where w' is the normalized weights of the first k−⌈k/2⌉ clusters and $C_j$ is the color triplet of the $j^{th}$ cluster. The global illumination of the face region is included in the calculations to compromise between considering dark skin tones and discarding the shadow pixels. Thus, the final skin tone is given by ("Equation 7"):

$$s = g\left(\left[\frac{s'_{Y'} + Y}{2}, s'_{Cb}, s'_{Cr}\right]\right),$$

where g is a transformation function that maps the Y'CbCr colors to the corresponding sRGB colors, Y is the median value of the luma channel of the face region (representing the global illumination of the face region), and $s'_i$ is a channel of the Y'CbCr of the initial estimation of the skin tone, such that i={Y', Cb, Cr}.

Figure 3:
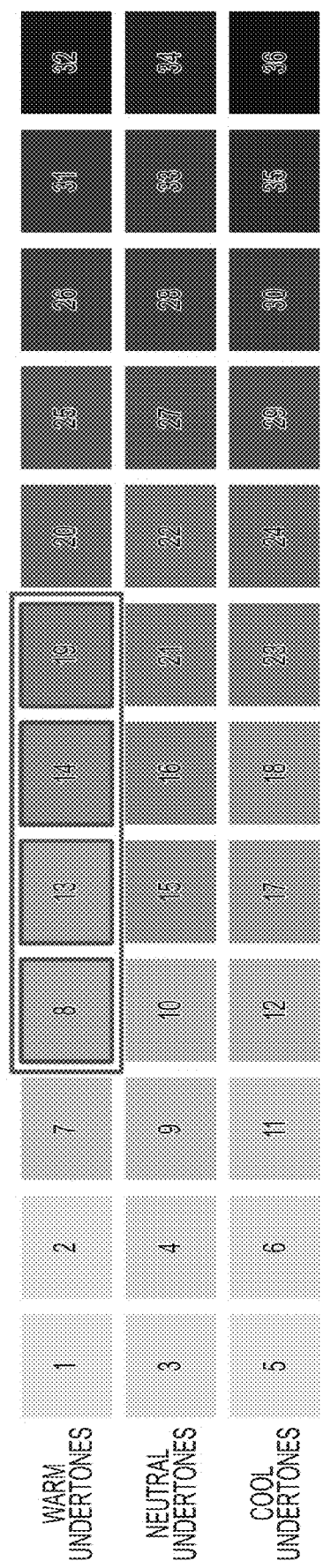
FIG. 3 shows a predetermined selection of color identifiers according to an embodiment of the present invention.

In an embodiment of the present invention, the first user input 101a and the second user input 101b are processed collectively to produce a color output 105. In this embodiment, the first user input 101a is modified for illumination conditions and processed to produce a color output; said color output being a user's current tone. The second user input 101b is analyzed to provide a range of color identifiers 108 representative of the user's current tone along with additional tones accounting for seasonal lightening and tanning. The range of color identifiers 108 comprises of between one and four values in the same row. See for example, FIG. 3. For example, if a user indicates that they do not tan or that their skin tone does not change with the seasons, then they have the same skin tone year-round and are assigned one color identifier 108 for every season. A user who indicates that they do tan may be assigned two or more color identifiers 108 distributed across the seasons. The second user input 101b queries comprise of a range of questions to assist with accuracy and automatic adjustments in producing a color output 105. These queries include skin type, undertone and tanning ability questions. By way of example only, the second user input 101b may include the Fitzpatrick Skin Type questionnaire, or the Fitzpatrick Skin Type questionnaire along with additional questions directed to undertone and tanning ability; However, other questionnaires which are commonly known in the art may also be used.

Figure 5:
FIG. 5 shows a screen prompting a first user input in the form of a digital image of a user's face.
Figure 6:
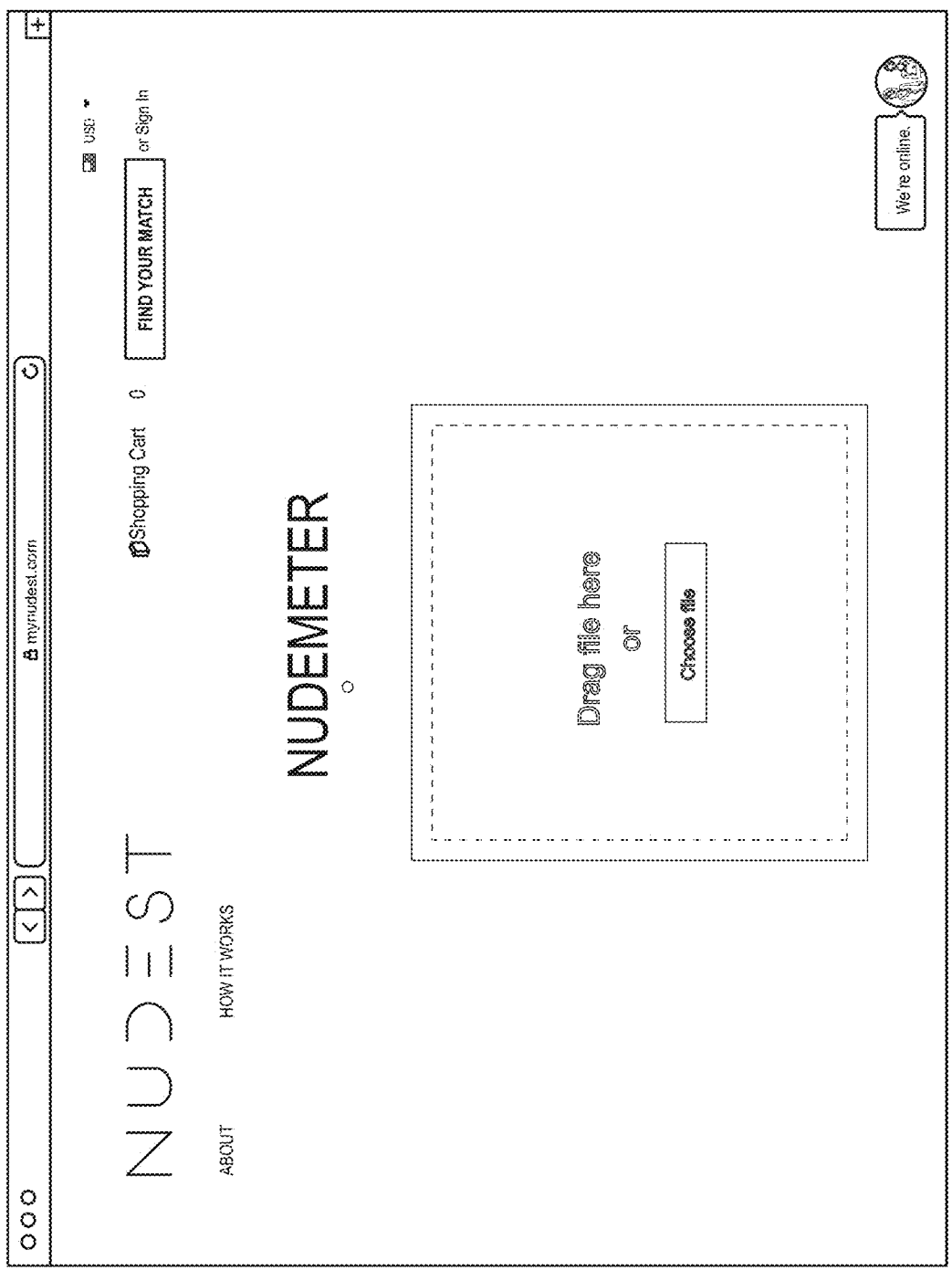
FIG. 6 shows a screen prompting a first user input in the form of a digital image of a user's face.
Figure 7:
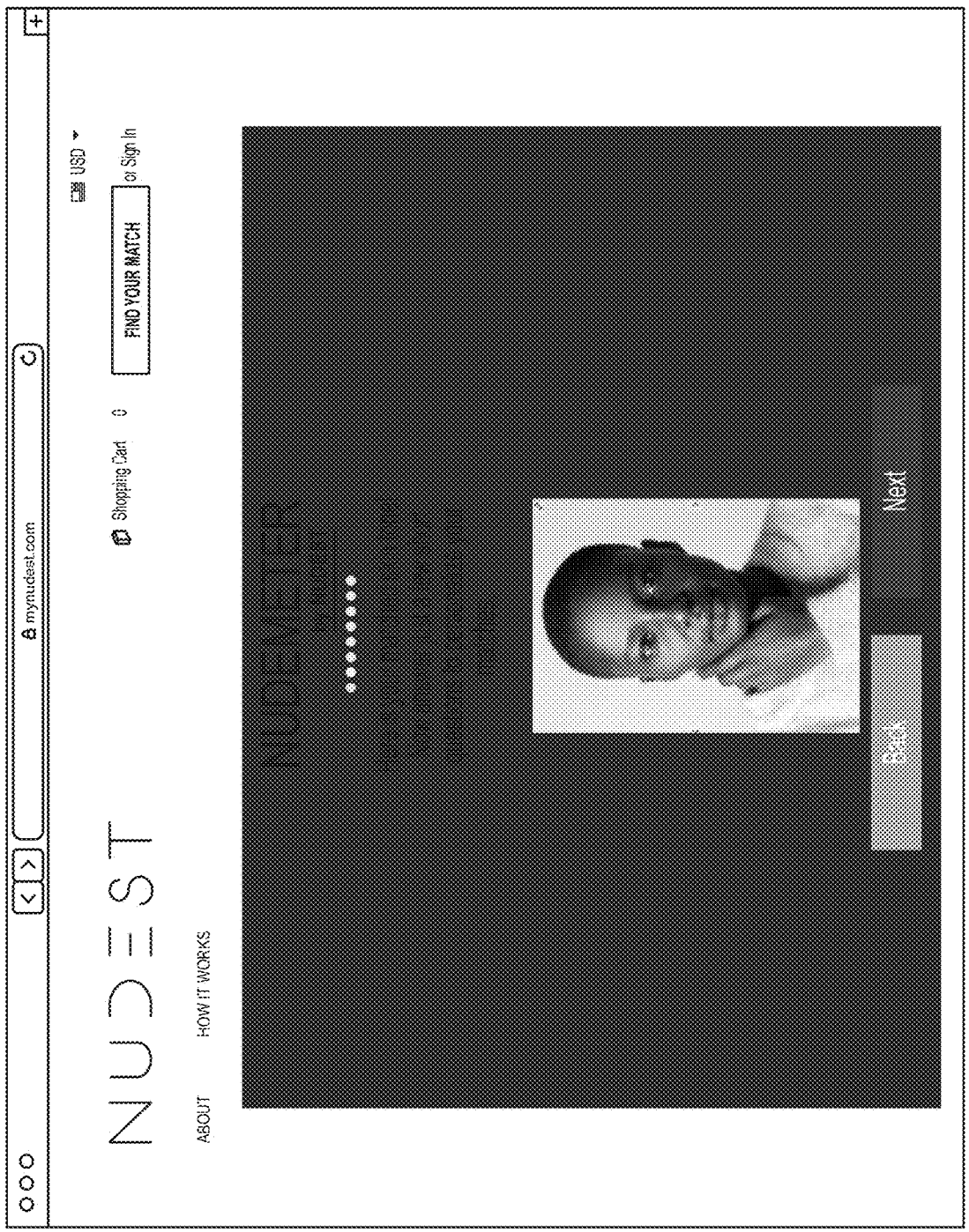
FIG. 7 shows a screen displaying a user's color match based on a first user input.
Figure 8:
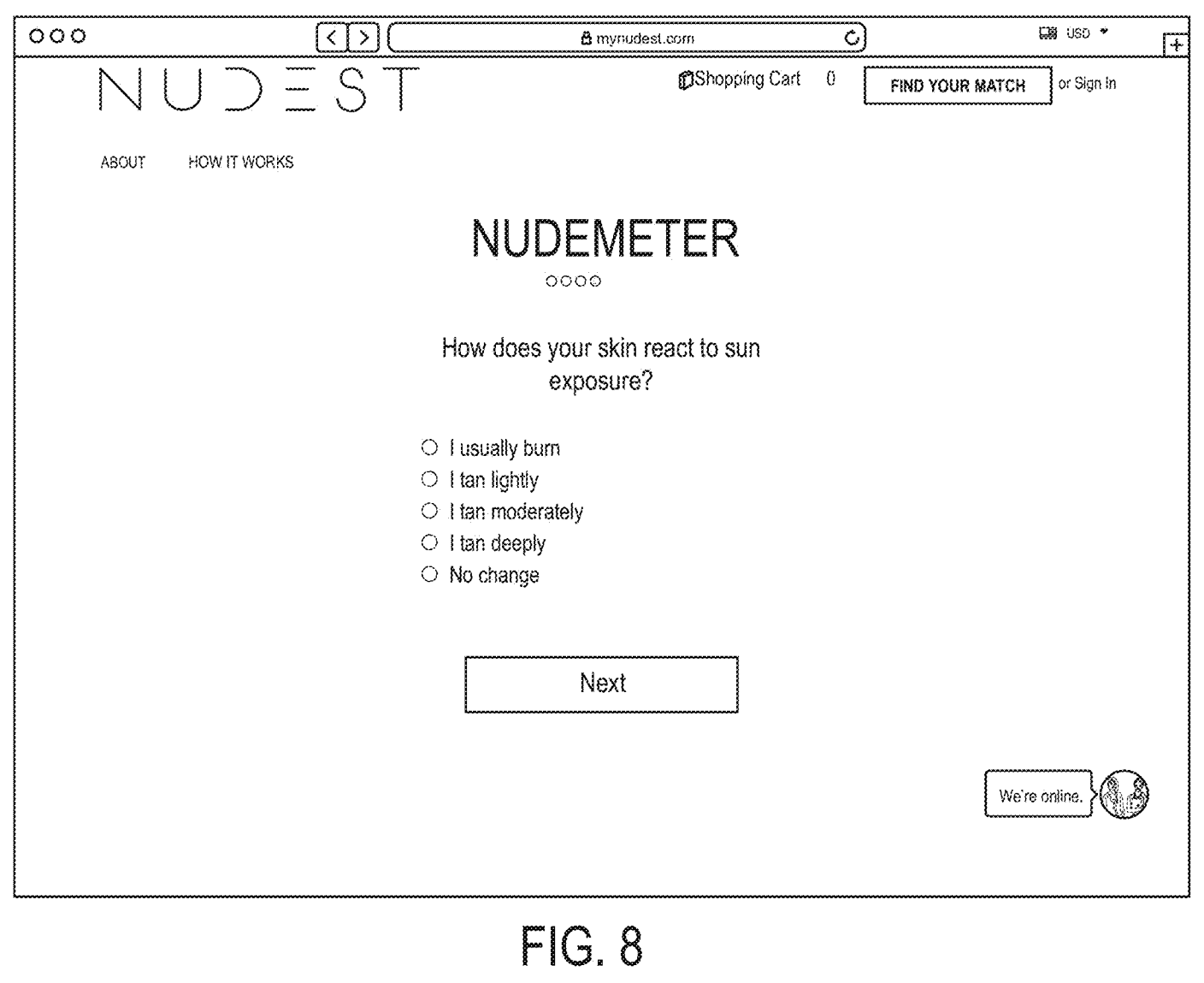
Figure 10:
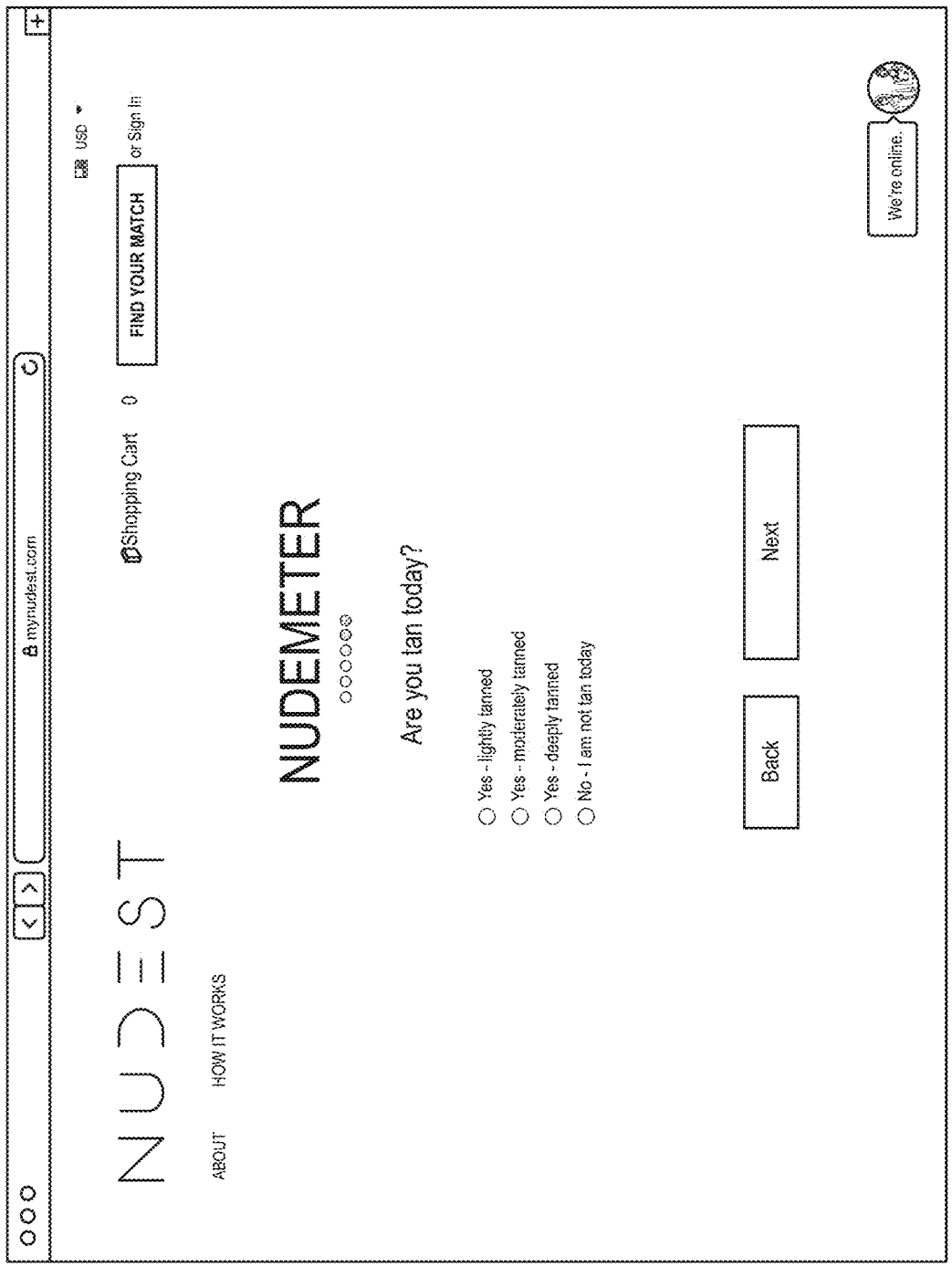
FIG. 10 shows a screen prompting a second user input.
Figure 11:
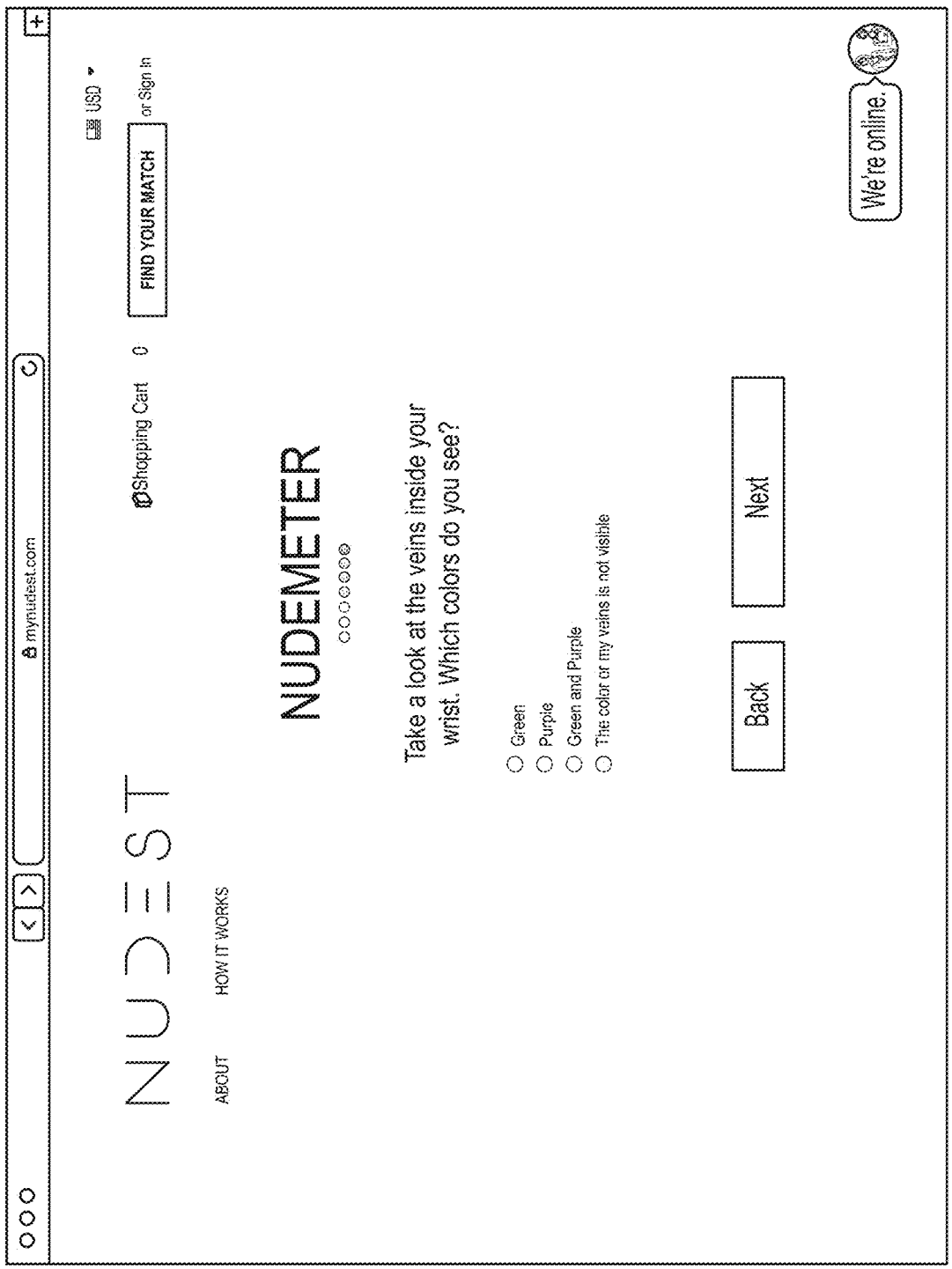
FIG. 11 shows a screen prompting a second user input.
Figure 12:
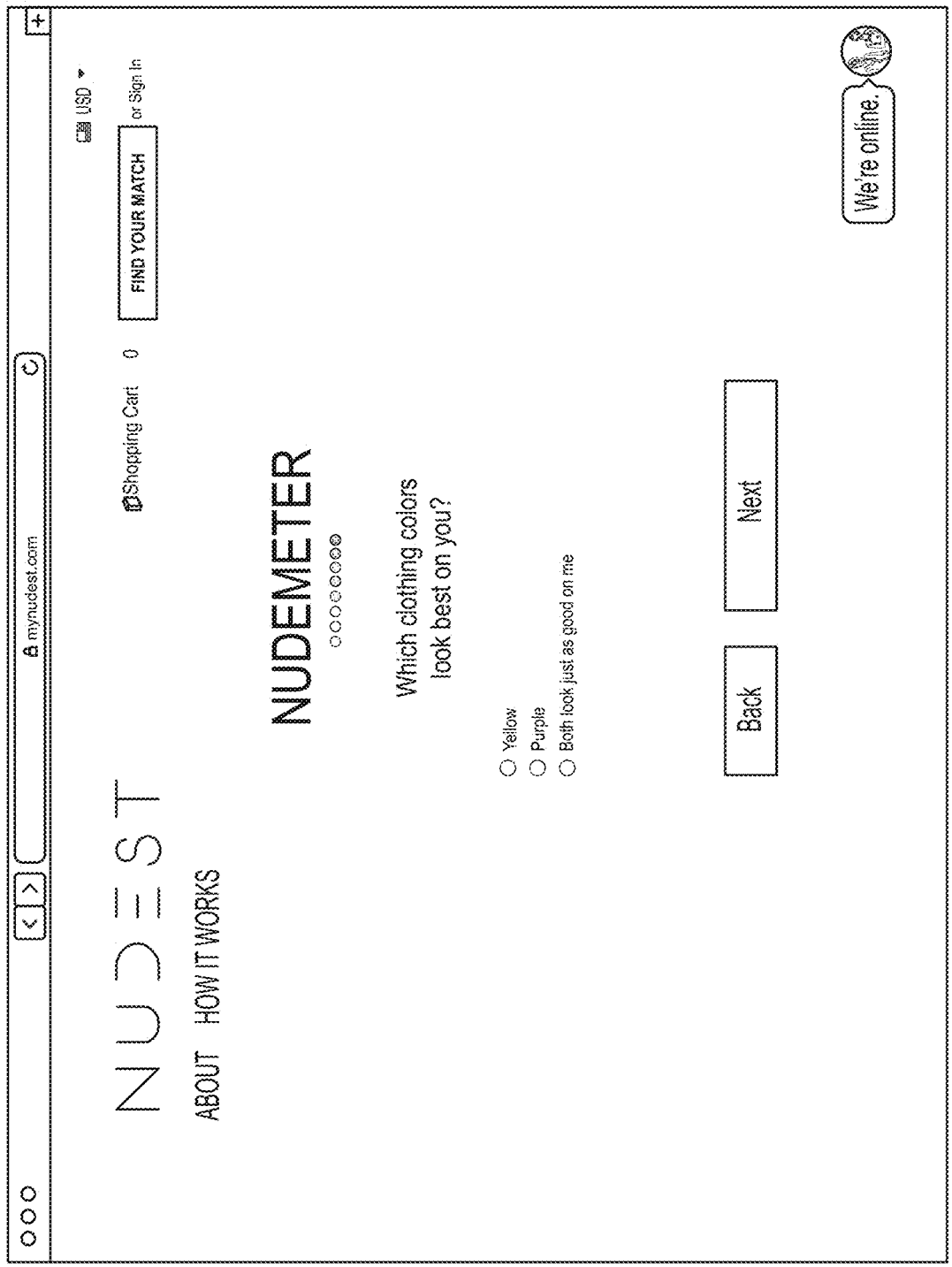
FIG. 12 shows a screen prompting a second user input.
Figure 13:
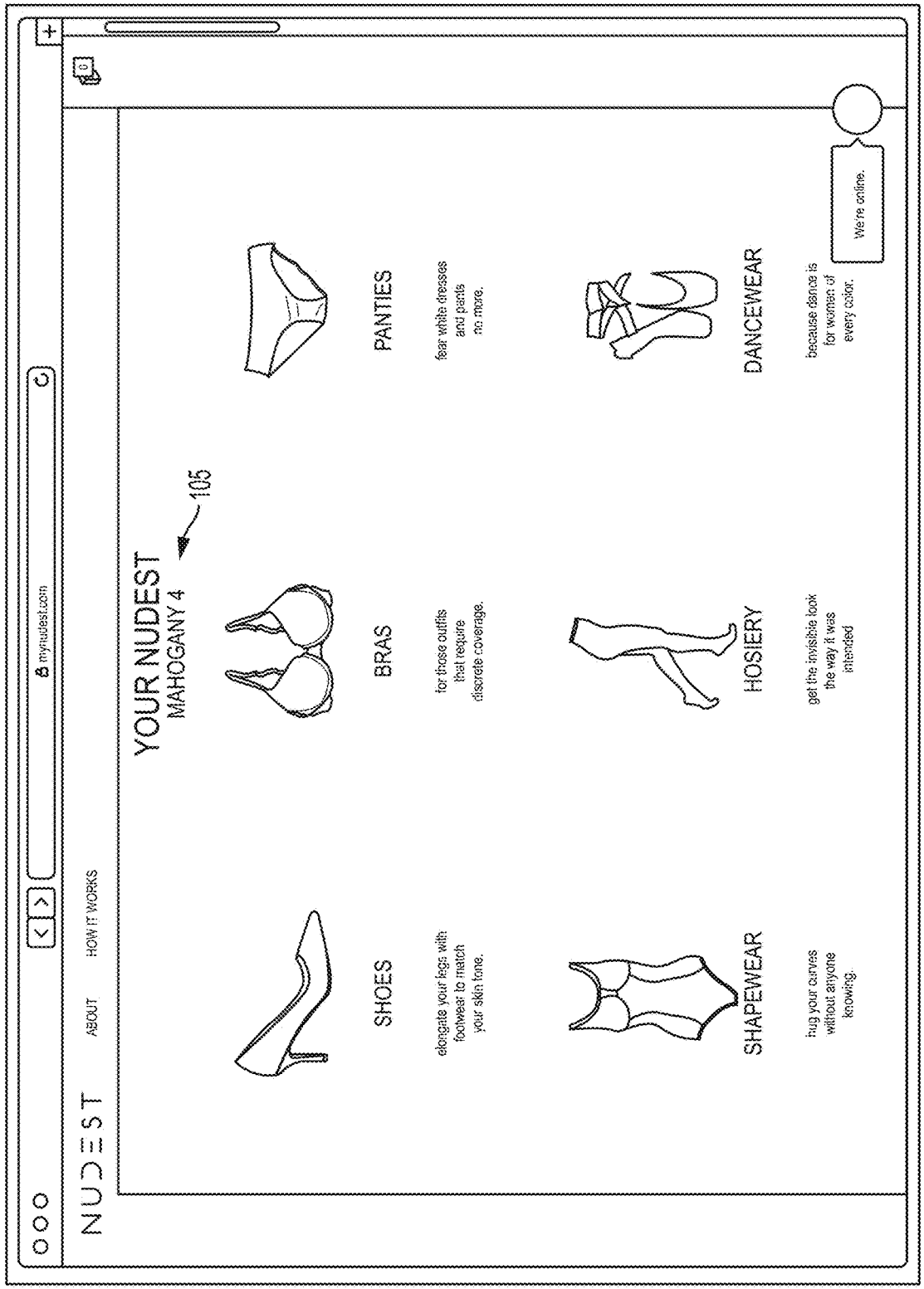
FIG. 13 shows a screen displaying product suggestions based on the color output.
Figure 14:
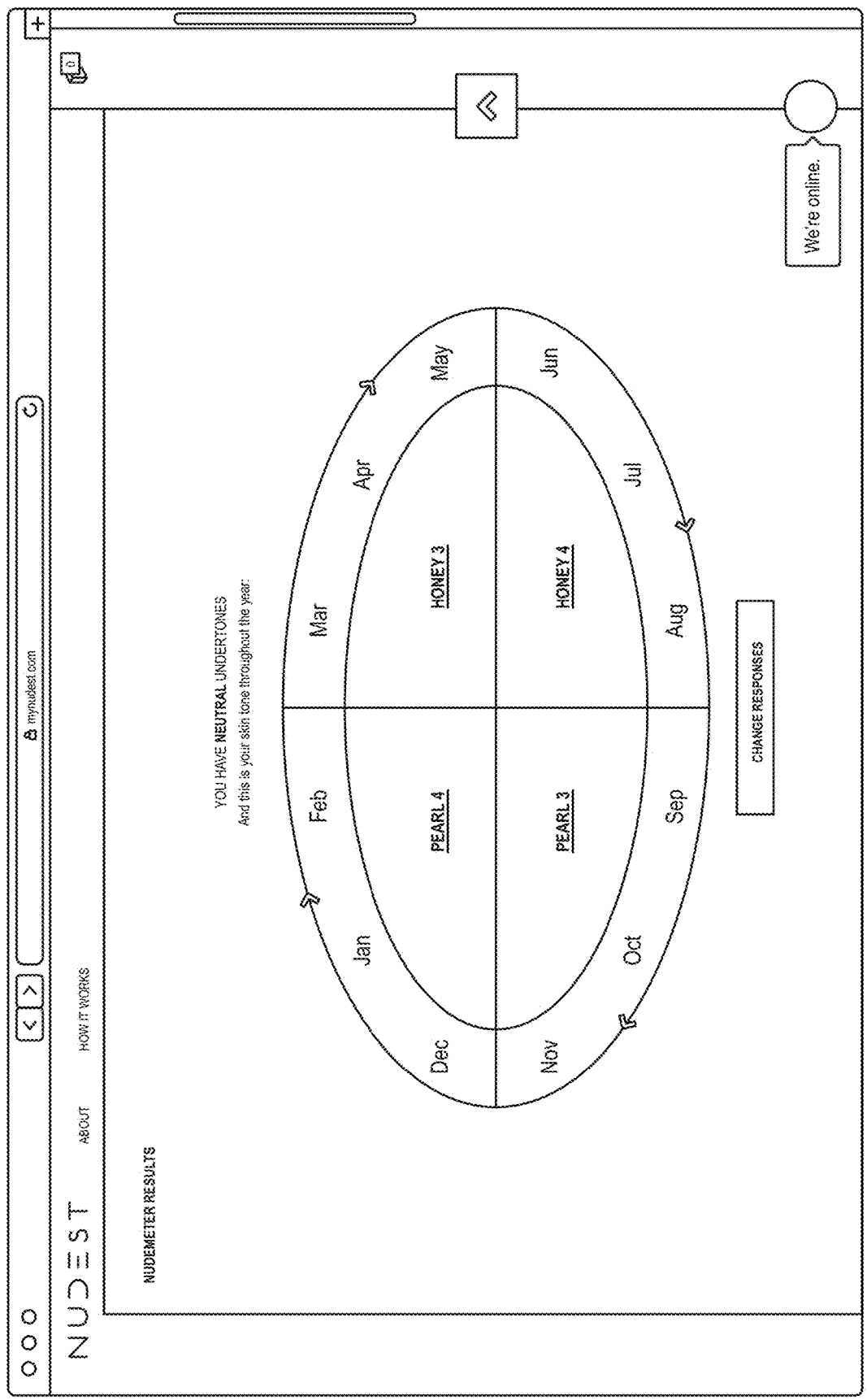
FIG. 14 shows a screen displaying the user's ability to filter products based on seasonal changes in the user's skin tone.

Turning now to the remaining figures, FIGS. 5-14 show example user screens of the system and method according to an embodiment of the present invention. In FIG. 5-7 the user uploads the first user input 101a in the form of a digital image of the user's face. FIGS. 8-12 show user prompts to provide a second user input 101b in the form of responses to a number of queries directed to skin type, undertone and tanning ability. FIG. 13 shows a resulting display of products corresponding to the user's current skin tone. FIG. 14 shows a display screen within the user's profile where the user may filter products by current tone or based on season.

In another embodiment of the present invention, the user input comprises only of a first user input 101a, in the form of digital images. The first user input 101a is modified for illumination conditions via the white balancing method and then processed to produce a color output 105. The color output 105 is compared to available products stored in a second database 106 to display suggested products to the user based on the produced color output 105.

In one embodiment of the present invention the system and method uses the user's color output 105 to select and display products with color identifiers 108 which are complementary to a user's skin tone. Complementary color identifiers 108 are assigned to a product's profile in the second database 106 at the time that the product profile is input. Such assignment may be manual or may be automatic based on the system's ability to learn from past assignments.

In another embodiment of the present invention the system and method is used on a commercial scale to match color swatches to predetermined color identifiers 108. In this embodiment, the user input comprises of a plurality of color swatches simultaneously uploaded for processing. Each color swatch is compared to the predetermined color identifiers 108 to produce a color output 105.

What is claimed is:

1. A system for analyzing and processing user input and providing a result based on a predetermined set of color identifiers, the system comprising:
    a first user input, wherein the first user input comprises of one or more digital images;
    a second user input, wherein the second user input comprises of responses to queries;
    a white balancing method for removing color casts from the first user input to create a final corrected image of the first user input;
    a first database for storing a predetermined set of color identifiers;
    a second database for storing product profiles; and
    a processor for analyzing the final corrected image of the first user input and the second user input collectively, comparing the final corrected image of the first user input and the second user input collectively to the predetermined set of color identifiers, providing a color output, and displaying product suggestions based on the color output.

2. The system of claim 1, wherein the white balancing method comprises:
    receiving the first user input, wherein the first user input is converted to the Y'CbCr color space, said Y'CbCr color space comprising of a Y' channel, and a Cb and a Cr channel;
    creating an affine color correction matrix by extracting a color feature vector from the Cb and Cr channels of the first user input, locating similar color feature vectors from a set of training samples and applying a local regression based on the training samples with similar color feature vectors;

applying the affine color correction matrix to the Cb and Cr channels of the first user input to remove color cast from the first user input to produce an initial corrected image of the first user input;

applying contrast stretching to the Y' channel of the initial corrected image of the first user input; and blending the Y' channel of the first user input and the result of the contrast stretching of the initial corrected image of the first user input to produce a final corrected image of the first user input.

3. The system of claim 2, wherein the color output comprises of one or more color identifiers.

4. The system of claim 3, wherein the first user input comprises of a digital image of a user and the processor further executes a skin detection algorithm for locating the areas on the final corrected image of the first user input that contain a user's skin.

5. A system for analyzing and processing user input and providing a result based on a predetermined set of color identifiers, comprising:
    a user input, said user input consisting essentially of one or more digital images;
    a white balancing method for removing color casts from the user input;
    a first database for storing a predetermined set of color identifiers;
    a second database for storing product profiles; and
    a processor for analyzing the user input, comparing the user input to the predetermined set of color identifiers, providing a color output, and displaying product suggestions based on the color output.

6. The system of claim 5, wherein the white balancing method comprises:
    receiving the user input, wherein the user input is converted to the Y'CbCr color space, said Y'CbCr color space comprising of a Y' channel, and a Cb and a Cr channel;
    creating an affine color correction matrix by extracting a color feature vector from the Cb and Cr channels of the user input, locating similar color feature vectors from a set of training samples and applying a local regression based on the training samples with similar color feature vectors;
    applying the affine color correction matrix to the Cb and Cr channels of the user input to remove color cast from the user input to produce an initial corrected image of the user input;
    applying contrast stretching to the Y' channel of the initial corrected image of the user input; and
    blending the Y' channel of the user input and the result of the contrast stretching of the initial corrected image of the user input to produce a final corrected image of the user input.

7. The system of claim 6, wherein the color output comprises of one or more color identifiers.

8. The system of claim 7, wherein the user input comprises of a digital image of a user and the processor further executes a skin detection algorithm for locating the areas in the final corrected image of the user input that contain a user's skin.

9. A method of analyzing and processing user input and providing a result based on a predetermined set of color identifiers, the method comprising:
    receiving a first user input, wherein the first user input comprises of one or more digital images of a user;
    using a white balancing method, removing color casts from the first user input to produce a final corrected image of the first user input;
    using a skin detection algorithm, locating the areas on the final corrected image of the first user input that contain a user's skin;
    comparing the final corrected image of the first user input to a predetermined set of color identifiers stored in a database;
    producing a color output; and
    displaying product suggestions based on the color output.

10. The method of claim 9, wherein the white balancing method comprises:
    selecting the user input, wherein the user input is converted to the Y'CbCr color space, said Y'CbCr color space comprising of a Y' channel, and a Cb and a Cr channel;
    creating an affine color correction matrix by extracting a color feature vector from the Cb and Cr channels of the user input, locating similar color feature vectors from a set of training samples and applying a local regression based on the training samples with similar color feature vectors;
    applying the affine color correction matrix to the Cb and Cr channels of the user input to remove color cast from the user input to produce an initial corrected image of the user input;
    applying contrast stretching to the Y' channel of the initial corrected image of the user input; and
    blending the Y' channel of the user input and the result of the contrast stretching of the initial corrected image of the user input to produce a final corrected image of the user input.

11. The method of claim 10, wherein the color output comprises of one or more color identifiers.

12. The method of claim 11, further comprising receiving a second user input, wherein the second user input comprises of responses to queries, and comparing the final corrected image of the first user input and the second user input collectively to a predetermined set of color identifiers stored in a database.

* * * * *